United States Patent [19]

Dannenberg

[11] Patent Number: 4,875,041
[45] Date of Patent: Oct. 17, 1989

[54] TIME MULTIPLEXED CONTROL OF AIR CORE GAUGES FROM A MICROPROCESSOR ADDRESS/DATA BUS

[75] Inventor: Robert D. Dannenberg, Fort Wayne, Ind.

[73] Assignee: Navistar International Transportation Corp., Chicago, Ill.

[21] Appl. No.: 274,094

[22] Filed: Nov. 21, 1988

[51] Int. Cl.[4] .............................................. H04Q 9/00
[52] U.S. Cl. ...................... 340/870.13; 340/870.11; 340/459; 340/461; 364/424.03; 307/10.1
[58] Field of Search ...................... 340/870.01, 870.11, 340/870.13, 825.07, 825.06, 459, 461, 462, 700; 307/10.1; 364/424.01, 424.03, 424.04, 424.05, 579, 580; 370/58, 77, 85; 33/178 E

[56] References Cited

U.S. PATENT DOCUMENTS

| | | | |
|---|---|---|---|
| 4,236,213 | 11/1980 | Richardson | 364/431.04 |
| 4,291,382 | 9/1981 | Full et al. | 364/551 |
| 4,302,814 | 11/1981 | Full et al. | 364/551 |
| 4,309,759 | 1/1982 | Tokuda et al. | 364/431.12 |
| 4,395,624 | 7/1983 | Wartski | 364/424.04 |
| 4,398,258 | 8/1983 | Naitoh et al. | 364/424.03 |
| 4,404,648 | 9/1983 | Miyakawa et al. | 364/424 |
| 4,507,706 | 3/1985 | Trexler, Jr. | 361/331 |
| 4,551,801 | 11/1985 | Sokol | 364/424 |
| 4,562,545 | 12/1985 | Hasegawa | 364/431.12 |
| 4,564,916 | 1/1986 | Hori et al. | 364/424.03 |
| 4,611,193 | 9/1986 | Bruggemann | 340/52 F |
| 4,630,043 | 12/1986 | Haubner et al. | 340/825.57 |
| 4,635,034 | 1/1987 | Tokuyama et al. | 340/52 F |
| 4,646,059 | 2/1987 | Iwamoto et al. | 340/52 F |
| 4,713,762 | 12/1987 | Igarashi | 364/424.01 |
| 4,725,838 | 2/1988 | Maschek et al. | 340/870.19 |
| 4,817,040 | 3/1989 | Bodley et al. | 364/424.04 |

Primary Examiner—Donald J. Yusko
Assistant Examiner—Tyrone Queen
Attorney, Agent, or Firm—F. David AuBuchon; Dennis K. Sullivan

[57] ABSTRACT

An instrumentation system in which air core gauges are adapted for use with a microprocessor that provides data for the gauges in digital form via an address/data bus. One of the principal features of the invention is that minimum circuitry interfaces the microprocessor with the air core gauges. Each gauge is assigned to a particular output device on the microprocessor memory map. The microprocessor addresses a particular gauge via the address bus at the same time that data for the gauge is present on the data bus. Each gauge comprises a sample and hold circuit and an air core driver circuit which operate the gauge's air core meter. The sample and hold circuits share a common digital-to-analog (D/A) converter which is interposed between the digital data bus and the sample and hold circuits. A meter selection logic circuit receives address information from the microprocessor and causes the analog information from the D/A converter to be sampled and held by the particular gauge that is identified by the particular address being supplied to the meter selection logic. Each sample and hold circuit holds the information that has been multiplexed to it to thereby provide a continuous output signal to the associated driver circuit which in turn drives the air core meter movement to a corresponding deflection that indicates the value of the data that is in its sample and hold circuit.

7 Claims, 3 Drawing Sheets

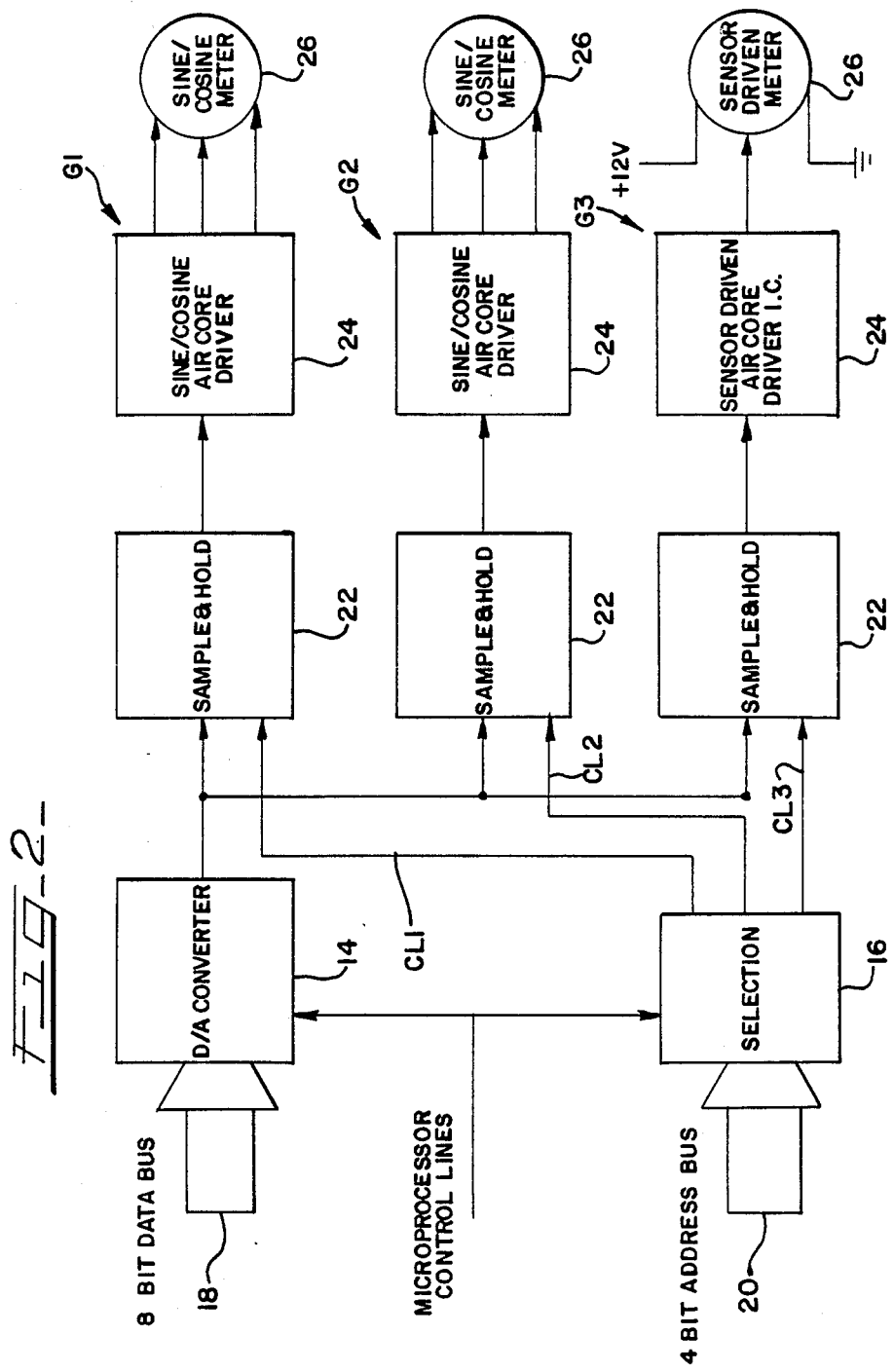

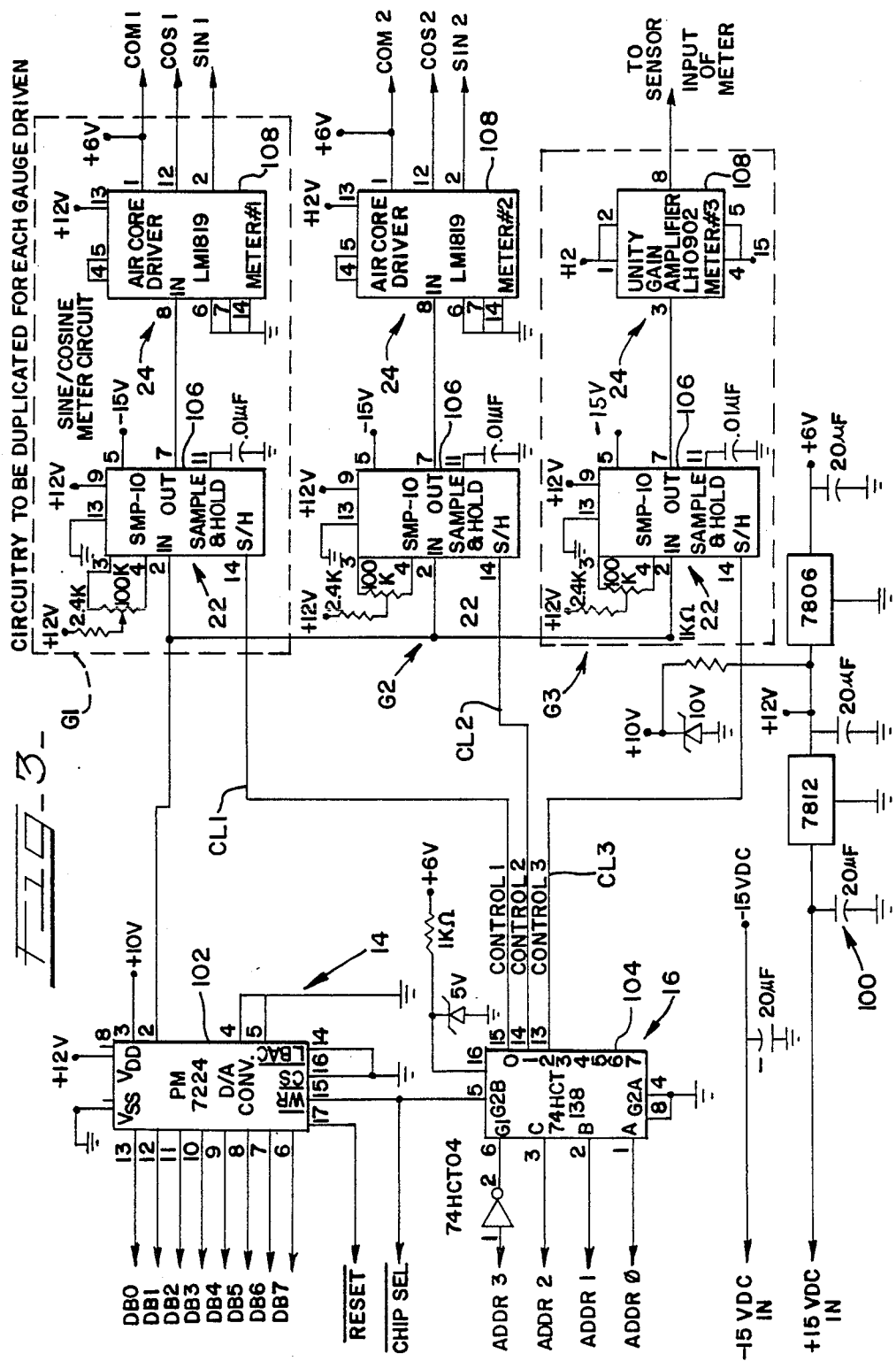

TIME MULTIPLEXED CONTROL OF AIR CORE GAUGES FROM A MICROPROCESSOR ADDRESS/DATA BUS

BACKGROUND AND SUMMARY OF THE INVENTION

This invention relates generally to electrical instrumentation systems that display, via air core instrument gauges, the values of parameters that are monitored by associated sensors. Instrumentation systems of this type are commonly used in automotive vehicles. The air core gauges are mounted in the instrument cluster of a vehicle to display the values of various operating parameters that are of interest, such as engine speed, engine oil temperature, engine oil pressure, etc.

More specifically, the invention relates to such a system in which air core gauges are adapted by means of electronic circuitry for use with a microprocessor that provides data for the gauges in digital form on an address/data bus.

An air core gauge comprises an electromechanical movement that is operated by an input whose value is representative of the particular parameter that is to be indicated by the gauge. As the value of the input to the gauge changes, so does the amount of deflection of the movement, and this produces a corresponding amount of deflection of a needle on the face of the gauge thereby providing an indication of the value of the parameter of interest. Two types of air core gauges that are used in automotive instrumentation systems are known respectively as sine/cosine meters and and sensor-driven meters. A sine/cosine meter receives respective sine and cosine input signals, the respective phases of which are variable to produce corresponding deflection of the gauge needle. In a sensor-driven meter the amount of DC current flowing through the movement is varied to produce a corresponding amount of needle deflection. In general a sine/cosine meter has a greater span of angular travel than does a sensor-driven meter.

Even with the advent of electronic systems, such as digital microprocessor-based ones, air core type gauges continue to enjoy substantial useage. In general such gauges can be mass produced at considerably lower costs than gauges that have digital electronic displays. Moreover, many people prefer the indication of a needle over the presentation of a number.

The present invention is concerned principally with a new and unique means for interfacing air core meters to a microprocessor with the use of minimal circuitry. This is particularly advantageous in automotive and truck instrumentation applications in facilitating the integration of microprocessors into these vehicles. One aspect of the disclosed embodiment of the invention is for adapting air core gauges to use digital data that is sourced from an SAE ATA serial data link so that engine and other subsystem information available on the data link may be displayed on gauges that are operated by a host microprocessor.

In order to accurately present an indication of the value of a particular parameter of interest, an air core gauge requires a continuous input. A further aspect of the present invention relates to the time multiplexed control of air core gauges from the host microprocessor. According to the disclosed implementation of the invention, each instrument gauge is assigned to be a particular output device on the microprocessor's memory map. The microprocessor addresses a particular gauge via the address bus at the same time that data for that gauge is present on the data bus. Electronic circuitry that is associated with each gauge is effective to retain the data and cause the gauge needle to continously indicate the correct needle deflection corresponding to the retained data.

The closest known approach to providing a continuous air core meter movement deflection from data that is intermittently present on a data bus from a microprocessor is disclosed in the commonly assigned co-pending application of Robert Onesti "STAND-ALONE UNIVERSAL GAUGE", Ser. No. 136,223, filing date Dec. 21, 1987. According to the diclosure of the Onesti patent application, a particular combination of electronic circuitry is embodied in an air core gauge to cause the gauge to indicate the latest value of a multi-bit data word supplied to the gauge from the microprocessor via the data bus. The data need be presented to the gauge only intermittently based on how fast the data is capable of changing. Thus, the system of the Onesti patent application is broadly a time multiplexing of individual air core gauges from a microprocessor. According to the Onesti invention, each air core gauge comprises a multi-bit latching memory circuit in which the latest multi-bit of digital data from the microprocessor for the particular gauge is latched. Each gauge further comprises a digital comparator circuit and a multi-bit counting circuit, the latter circuit repeatedly counting a predetermined number of bits at a particular counting frequency. The digital comparator receives the outputs of the digital counting circuit and of the multi-bit latching memory circuit. A flip-flop is operated by the digital comparator circuit and the relative proportion of the flip-flop set time to the flip-flop reset time is indicative of the value of the count that is latched in the gauge's multi-bit latching memory circuit. The output of the flip-flop therefore provides a pulse-width modulated waveform whose degree of pulse width modulation is representative of the value of data latched in the multi-bit latching memory circuit. This pulse width modulated waveform operates the air core gauge movement, producing a deflection corresponding to the value of the data latched in the gauge's multi-bit latching memory circuit. The data is periodically updated so that the needle can follow changes in the data.

The present invention relates to a new and unique organization and arrangement of electronic circuitry that enables an air core gauge to be operated by digital data from a microprocessor that is intermittently presented on a data bus. This electronic circuitry comprises a relatively few number of circuit components for each gauge. In particular, each gauge comprises only a sample and hold circuit, an air core driver circuit and an air core meter. The sample and hold circuits share a common digital-to-analog (D/A) converter which is interposed between the digital data bus, on which digital data periodically appears, and the sample and hold circuits of the individual gauges. The D/A converter converts each piece of data into an analog form which is presented on a common line to the analog sample and hold circuits of all the gauges.

A meter selection logic circuit is also included to receive digital address information from the microprocessor memory map. The particular address that is being supplied on the address bus to the meter selection logic circuit is correlated with the particular data that is present on the data bus. The meter selection logic causes the analog information from the D/A converter to be sampled and held by the particular gauge that is identified by the meter selection logic. In this way, the correct data is supplied to the correct gauge. The sample and hold circuit that is particular to each gauge is capable of holding the information that has been multiplexed to it. It thereby provides a corresponding continous output signal to the gauge's air core driver circuit which in turn drives the air core meter movement to a corresponding deflection so that the meter indicates the value of the data that is in its sample and hold circuit. Each gauge need be updated at a rate corresponding to a rate which will overcome the "droop rate" of the sample and hold being used. Typically ten times a second update rate is sufficient.

One of the attributes of an instrumentation system that embodies principles of the present invention is that there is an opportunity for substantial gauge commonality. This is because data is prescaled in the microprocessor to produce a given meter deflection. In other words, to produce a particular reading on a particular gauge, the value of the data to produce the correct gauge reading is the value of the data that is supplied to the sample and hold circuit that is associated with that gauge. In this way, gauges of common design can be substituted for one another and the same amount of deflection will be assured for the same data signal. With this commonality of gauges it may be unnecessary to procure and stock different types of gauges such as different voltmeters, amperage meters, resistive sensor meters, etc. In obtaining this gauge commonality it is assumed that any legend that is associated with a particular gauge would be either readily changeable or else that such a legend would be incorporated as a fixed part of the instrument cluster design.

The foregoing features, advantages, and benefits, of the invention, along with additional ones, will be seen in the ensuing description and claims which should be considered in conjunction with the accompanying drawings. The drawings disclose a presently preferred embodiment of the invention in accordance with the best mode contemplated at the present time in carrying out the invention.

BRIEF DESCRIPTION OF THE DRAWINGS

FIG. 2 is a block diagram showing further detail of a portion of the block diagram of FIG. 1.

FIG. 3 is a schematic diagram illustrating details of FIG. 2.

DESCRIPTION OF THE PREFERRED EMBODIMENT

Figure 1:
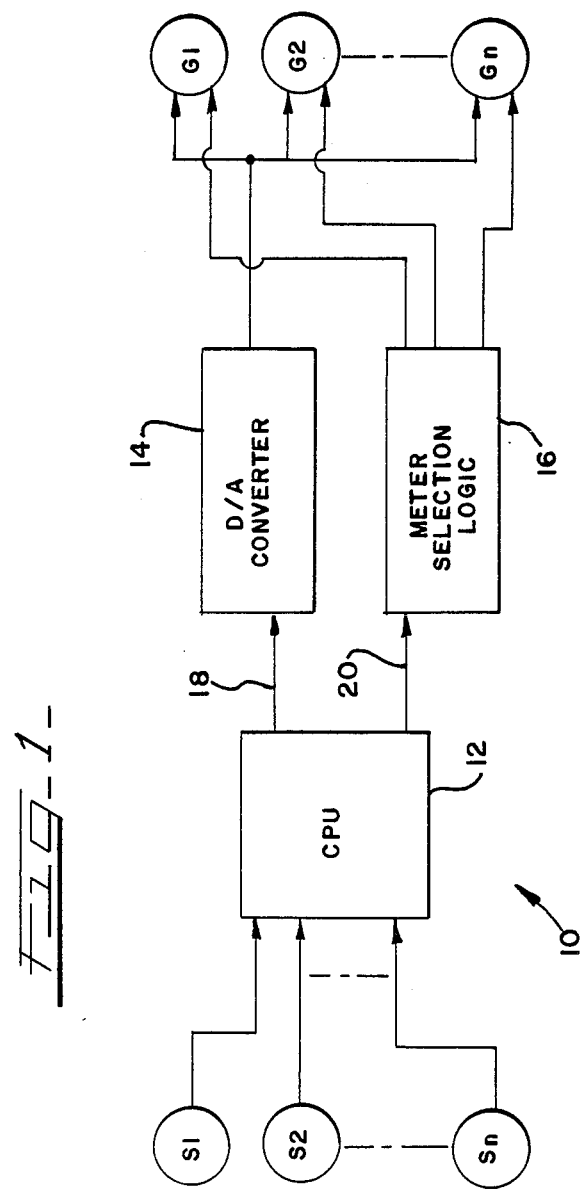
FIG. 1 is a generalized block diagram of an instrumentation system embodying principles of the present invention.

FIG. 1 portrays an instrumentation system 10 that comprises a number of sensors S1, S2, ... Sn that provide data signals for respective parameters being measured. These data signals are supplied to a central processing unit (CPU) 12 that contains electronic data processing devices such as a microprocessor and associated components. The actual input data to the CPU may be from any combination of analog-to-digital (A/D) converters, instrumentation amplifiers, or an SAE ATA serial data link. Associated with CPU 12 are a digital to analog (D/A) converter circuit 14 and a meter selection logic circuit 16.

The data input signals are processed by CPU 12, and circuits 14, and 16, and supplied to respective gauges G1, G2 ... Gn. Each gauge comprises an air core meter movement with which is associated an indicating needle, or pointer, on the face of the gauge. The system operates such that the indicating needle of each gauge is operated to a position of deflection that indicates the value of the parameter that is being measured. In an automotive vehicle instrumentation system, the gauges G1, G2, ... Gn are located in the vehicle's instrument cluster. The sensors are located at remote locations such as on the vehicle engine and powertrain. Useful information, such as engine speed, engine oil temperature, engine oil pressure, engine coolant temperature, is derived from corresponding sensors mounted at appropriate locations on the vehicle and coupled to the CPU by suitable circuitry. The precise manner of interfacing the sensors to the CPU will depend upon the particular types of sensors used. The CPU is mounted in an appropriate location, such as inside the cab or body of the vehicle, and coupled by suitable wiring with the D/A converter 14 and the meter selection logic 16, both of which are in turn coupled with the instrument cluster mounted gauges G1, G2 ... Gn.

CPU 12 provides output data in the form of multi-bit words on a data bus 18. In the example that is described and illustrated, data is presented in an eight-bit format so that the value of each word has a potential range of 256 increments. Each gauge is also assigned a particular location that is uniquely addressed by the CPU to present data to the gauge. In the illustrated example, there is a four-bit address bus 20 that couples CPU 12 to meter selection logic 16. With a four-bit address bus, sixteen gauges can be addressed. In the case of typical automotive gauges, the 256-increments of gauge movement will almost invariably provide more than enough resolution.

CPU 12 processes the data from the various sensor inputs and provides corresonding eight-bit data words on data bus 18. The time at which a particular data word derived from a particular sensor is presented on data bus 18 depends upon the manner in which the CPU is programmed to process and present the information on the data bus. The CPU programming is also coordinated with the memory mapping technique whereby the particular data word that appears on data bus 18 is steered to a particular gauge in accordance with a correlated address that appears on address bus 20. In other words, each unique address that appears on address bus 20 is correlated with a particular one of the sensors and a corresponding one of the gauges whereby the address that is present on address bus 20 identifies the particular gauge to which the data on address bus 18 is to be steered. It is in this way that the data from a particular sensor is presented to the correct gauge.

According to principles of the invention that result in a minimum amount of circuitry for operating each gauge, the gauges share D/A converter 14 and each gauge comprises an analog sample and hold circuit 22 and an air core driver circuit 24.

FIG. 2 shows three gauges G1, G2, and G3. The gauge G1 comprises a sample and hold circuit 22, a sine/cosine air core driver 24 and a sine/cosine meter 26. The second gauge G2 is of the same type as gauge G1 comprising its own sample and hold circuit 22, its own sine/cosine air core driver 24 and its own sine/cosine meter 26. Gauge G3 comprises a sample and hold circuit 22, a sensor-driven air core driver circuit in the form of a unity gain amplifier 24, and a sensor-driven meter 26. All meters 26 are of the air core type. The difference between a sine/cosine meter and a sensor-driven meter resides in the manner in which the meter movements are operated. For a sine/cosine meter the movement is operated by supplying to the meter respective sine and cosine waves which are relatively adjustable in phase. Adjustment of the relative phase of the sine and cosine waves changes the amount of meter deflection. In exemplary sine/cosine meters, the indicator movement has a span of 305° maximum in increments of 2° minimum. In a sensor-driven type gauge, the amount of meter deflection is dependent upon the effective signal that is presened to the meter from the driver circuit. In general a sensor-driven meter has a smaller angular span of deflection than a sine/cosine meter.

Meter selection logic 16 has a number of individual control line outputs each of which is assigned to a particular gauge. Thus when gauge G1 is to be supplied data from the data bus, the control line CL1 is made active; when gauge G2 is to receive data, the control line CL2 is activated, and when gauge G3 is to receive data, the control line CL3 is activated.

Activation of a particular control line causes the corresponding sample and hold circuit 22 to sample the output of D/A converter 14. When the meter selection logic is operated to activate a different control line, the sample and hold circuit that had been immediately previously activated will retain or remember the voltage which it sampled from D/A converter 14. In this way a continuous voltage signal is supplied from the sample and hold circuit to the corresponding air core driver circuit and that signal represents the value of the data that the meter is to display.

FIG. 3 portrays a detailed electrical schematic diagram of a particular implimentation which in large part makes use of integrated circuit devices. The reference numeral 100 designates a power supply that develops suitable D.C. voltages used by the integrated circuits. The D/A converter is represented by a PM-7224 integrated circuit device 102. The data bus, consisting of eight bits, is represented by a 74HCT138 integrated circuit device. The address bus, consisting of four bits, is an input to device 104.

The analog output of device 102 is at pin 2 thereof, and it is seen that this pin connects to analog signal inputs of the sample and hold integrated circuit devices 106 of all gauges. Each device 106 is an SMP-10 integrated circuit which has a sample and hold input (S/H) that is coupled by a particular control line to a particular output of device 104.

In addition to its sample and hold device 106, each gauge comprises a driver circuit device 108. In the case of gauges G1 and G2, the driver circuit device 108 is an air core driver integrated circuit LM1819. In the case of gauge G3, the driver circuit is a unity gain amplifier LH0002. The outputs of the respective devices 108 in turn connect to the respective meters.

The foregoing description and the accompanying drawings have disclosed a new and useful improvement in operating air core gauges from a microprocessor address/data bus via time multiplexed control. While a preferred embodiment of the invention has been disclosed, it will be appreciated that the claims are intended to be generic to other equivalent embodiments even though those embodiments may differ in certain details from the preferred embodiment which has been disclosed.

What is claimed is:

1. In an instrumentation system in which data representing the values of various parameters of interest is presented to a central processing unit (CPU), and the CPU processes the data presented to it and in turn intermittently presents the data for each parameter of interest as a multi-bit value on a multi-bit digital data bus, the improvement for displaying the data for each parameter of interest via the air core meter movement of a corresponding gauge by addressing each gauge via an address bus when data for the gauge is present on the data bus, said improvement comprising:
   (a) a digital-to-analog converter circuit that is shared by all gauges, said digital-to-analog converter circuit having an input and an output, the input of said digital-to-analog converter circuit being coupled to the data bus;
   (b) gauge selection means having an input coupled to the address bus and a plurality of outputs each of which is connected to a corresponding gauge, said gauge selection means comprising means for selectively activating its outputs in accordance with addresses supplied to it via the address bus so as to enable each gauge to be selectively activated to receive data;
   (c) each gauge comprising a sample and hold circuit having a first input coupled to the digital-to-analog converter circuit output and a second input coupled to a particular one of the gauge selection means outputs, each sample and hold circuit comprising means for causing the signal at its first input to be sampled and to be held at an output thereof when its second input is activated by said gauge selection means; and
   (d) each gauge further comprising a driver circuit having an input that is coupled to the output of its sample and hold circuit and an output by which the movement of its air core meter is operated.

2. The improvement set forth in claim 1 in which the driver circuit of at least one of said gauges comprises a sine/cosine air core driver circuit and the air core meter thereof comprises a sine/cosine meter.

3. The improvement set forth in claim 1 in which the driver circuit of at least one of said gauges comprises a unity gain amplifier circuit and the air core meter thereof comprises a sensor-driven meter.

4. For use in an instrumentation system in which data representing the values of various parameters of interest is presented to a central processing unit (CPU), the CPU processing the data presented to it and in turn intermittently presenting the data for each parameter of interest as a multi-bit value on a multi-bit digital data bus, the data for each parameter of interest being displayed via the air core meter movement of a corresponding gauge by addressing each gauge via an address bus when data for the gauge is present on the data bus, a digital-to-analog converter circuit being shared by all gauges, said digital-to-analog converter circuit having an input and an output, the input of said digital-to-analog converter circuit being coupled to the data bus, and gauge selection means having an input coupled to the address bus and a plurality of outputs each of which is connected to a corresponding gauge and comprising means for selectively activating its outputs in accordance with addresses supplied to it via the address bus so as to enable each gauge to be selectively activated to receive data an improved gauge comprising:
   (a) a sample and hold circuit having a first input for coupling to the digital-to-analog converter circuit output and a second input for coupling to a particular one of the gauge selection means outputs, said sample and hold circuit comprising means for causing the signal at its first input to be sampled and to be held at an output thereof when its second input is activated by said gauge selection means; and (b) further comprising a driver circuit having an input that is coupled to the output of its sample and hold circuit and an output by which the movement of its air core meter is operated.

5. A gauge as set forth in claim 4 in which the driver circuit of said gauge comprises a sine/cosine air core driver circuit and the air core meter thereof comprises a sine/cosine meter.

6. The improvement set forth in claim 4 in which the driver circuit of said gauge comprises a unity gain amplifier circuit and the air core meter thereof comprises a sensor-driven meter.

7. For use in a gauge of an instrumentation system in which data representing the values of various parameters of interest is presented to a central processing unit (CPU), the CPU processing the data presented to it and in turn intermittently presenting the data for each parameter of interest as a multi-bit value on a multi-bit digital data bus, the data for each parameter of interest being displayed via the air core meter movement of a corresponding gauge by addressing each gauge via an address bus when data for the gauge is present on the data bus, a digital-to-analog converter circuit being shared by all gauges, said digital-to-analog converter circuit having an input and an output, the input of said digital-to-analog converter circuit being coupled to the data bus, and a gauge selection means having an input coupled to the address bus and a plurality of outputs each of which is connected to a corresponding gauge and comprising means for selectively activating its outputs in accordance with addresses supplied to it via the address bus so as to enable each gauge to be selectively activated to receive data an improved gauge circuit means comprising:

(a) a gauge circuit for operating the movement of its air core meter comprising a sample and hold circuit having a first input for coupling to the digital-to-analog converter circuit output and a second input for coupling to a particular one of the gauge selection means outputs, said sample and hold circuit comprising means for causing the signal at its first input to be sampled and to be held at an output thereof when its second input is activated by said gauge selection means; and (b) a driver circuit having an input that is coupled to the output of said sample and hold circuit and an output by which the movement of its air core meter is operated.

* * * * *